(12) United States Patent
Ewart et al.

(10) Patent No.: US 10,336,846 B2
(45) Date of Patent: Jul. 2, 2019

(54) PROCESS TO FORM ETHYLENE/α-OLEFIN INTERPOLYMERS

(71) Applicant: Dow Global Technologies LLC, Midland, MI (US)

(72) Inventors: Sean W. Ewart, Pearland, TX (US); Susan G. Brown, Pearland, TX (US); Daniela Ferrari, Rosharon, TX (US); Edward O. Madenjian, Lake Jackson, TX (US); Gregory J. Brennan, Angleton, TX (US)

(73) Assignee: Dow Global Technologies LLC, Midland, MI (US)

( * ) Notice: Subject to any disclaimer, the term of this patent is extended or adjusted under 35 U.S.C. 154(b) by 24 days.

(21) Appl. No.: 15/574,275

(22) PCT Filed: May 9, 2016

(86) PCT No.: PCT/US2016/031408
§ 371 (c)(1),
(2) Date: Nov. 15, 2017

(87) PCT Pub. No.: WO2016/191076
PCT Pub. Date: Dec. 1, 2016

(65) Prior Publication Data
US 2018/0148526 A1    May 31, 2018

Related U.S. Application Data

(60) Provisional application No. 62/167,500, filed on May 28, 2015.

(51) Int. Cl.
*C08F 210/18*    (2006.01)
*C08F 2/06*    (2006.01)
(Continued)

(52) U.S. Cl.
CPC ............ *C08F 210/18* (2013.01); *C08F 4/659* (2013.01); *C08F 4/65908* (2013.01); *C08F 4/65912* (2013.01); *C08F 2400/02* (2013.01)

(58) Field of Classification Search
CPC .. C08F 210/18; C08F 210/06; C08F 4/64193; C08F 4/659; C08F 4/65908;
(Continued)

(56) References Cited

U.S. PATENT DOCUMENTS

| 6,147,025 A | * | 11/2000 | Gillis | ...................... C08F 10/00 502/118 |
| 9,422,383 B2 | | 8/2016 | LiPiShan et al. | |
| 9,534,070 B2 | | 1/2017 | Spencer et al. | |
| 2017/0267796 A1 | | 9/2017 | Klosin et al. | |

FOREIGN PATENT DOCUMENTS

| WO | 06/020624 A1 | 2/2006 |
| WO | 2007/136493 A2 | 11/2007 |

(Continued)

OTHER PUBLICATIONS

PCT/US2016/031408, International Search Report and Written Opinion dated Sep. 2, 2016.
PCT/US2016/031408, International Preliminary Report on Patentability dated Dec. 7, 2017.

*Primary Examiner* — William K Cheung
(74) *Attorney, Agent, or Firm* — Husch Blackwell LLP

(57) ABSTRACT

The invention provides a process to form an ethylene/a-olefin interpolymer, comprising at least the following steps A) through C): A) polymerizing, in at least one reactor, at least one reaction mixture comprising ethylene and the a-olefin, in a solution polymerization, and in the presence of at least the following components I), II) and III): I) at least one compound of Structure 1, as described herein; II) at least one co-catalyst, as described herein; III) at least one compound of Structure 2, as described herein; B) separating the final polymer solution into at least a polymer-rich solution and a polymer-free solution; and optionally, at least a portion of the polymer-free solution is recycled back to the reactor; C) maintaining the level of the at least one compound of (Continued)

Structure 2 in the at least one reactor, from 100 ppm to 10,000 ppm, as described herein.

10 Claims, 1 Drawing Sheet

(51) Int. Cl.
*C08F 210/06* (2006.01)
*C08F 236/20* (2006.01)
*C08F 4/659* (2006.01)

(58) Field of Classification Search
CPC ...... C08F 4/65912; C08F 2/06; C08F 236/20; C08F 2500/03; C08F 2500/09; C08F 2500/17; C08F 2500/02; C08F 2500/25
USPC .......................................................... 526/59
See application file for complete search history.

(56) References Cited

FOREIGN PATENT DOCUMENTS

| | | | |
|---|---|---|---|
| WO | 2007/136494 | A2 | 11/2007 |
| WO | 2007136495 | A2 | 11/2007 |
| WO | 2007136496 | A2 | 11/2007 |
| WO | 2007136497 | A2 | 11/2007 |
| WO | 2007136506 | A2 | 11/2007 |
| WO | 2009/067337 | A1 | 5/2009 |
| WO | 2010/033601 | A1 | 3/2010 |
| WO | 11/008837 | A1 | 1/2011 |
| WO | 2011002986 | A1 | 1/2011 |
| WO | 2011002998 | A1 | 1/2011 |
| WO | 2013/096573 | A1 | 6/2013 |

\* cited by examiner

PROCESS TO FORM ETHYLENE/α-OLEFIN INTERPOLYMERS

REFERENCE TO RELATED APPLICATIONS

This application is a National Stage application of PCT International Application No. PCT/US2016/031408, filed May 9, 2016, which claims priority to Provisional Application No. 61/167,500, filed May 28, 2015, the disclosures of which are expressly incorporated by reference herein.

BACKGROUND OF THE INVENTION

Long chain branching in ethylene-based interpolymers, for example, EPDM interpolymers, is typically controlled by either reactor conditions and/or the use of branching agents. In some EPDM polymerizations, branching agents, such as vinylnorbornene or 1,5-hexadiene, are used to produce H branches, but these compounds are prone to form gels in the final interpolymer. Increasing ethylene conversion or polymer content typically increases the amount of long chain branching in the final polymer; however, any increase in the ethylene conversion can lead to undesired decreases in catalyst efficiency, and further the polymer content is limited by solution viscosity. There is a need to modify and control long chain branching levels in an ethylene-based interpolymer, without using reactor conditions that limit catalyst efficiency, and without using branching agents that are prone to increase gel levels in the final polymer. This need has been met by the following invention.

SUMMARY OF INVENTION

The invention provides a process to form an ethylene/α-olefin interpolymer, said process comprising at least the following steps A) through C):

A) polymerizing, in at least one reactor, at least one reaction mixture comprising ethylene and the α-olefin, in a solution polymerization, and, in the presence of at least the following components I), II) and III), to form a final polymer solution;

I) at least one compound of Structure 1 below:

(Structure 1)

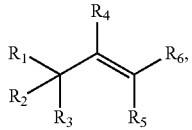

wherein for Structure 1:

M is titanium, zirconium, or hafnium, each independently being in a formal oxidation state of +2, +3, or +4; n is an integer of from 0 to 3, wherein when n is 0, X is absent;

each X independently is a monodentate ligand that is neutral, monoanionic, or dianionic; or two X are taken together to form a bidentate ligand that is neutral, monoanionic, or dianionic; and wherein X and n are chosen in such a way that the metal-ligand complex of Structure 1 is, overall, neutral;

each Z independently is O or S;

L is hydrocarbylene or heterohydrocarbylene, wherein the hydrocarbylene has a portion that comprises a 1-carbon atom to 6-carbon atom linker backbone, linking the Z atoms in Structure 1, and the heterohydrocarbylene has a portion that comprises a 1-atom to 6-atom linker backbone, linking the Z atoms in Structure 1, wherein each atom of the 1-atom to 6-atom linker backbone of the heterohydrocarbylene independently is a carbon atom or a moiety comprising a heteroatom, wherein each moiety comprising a heteroatom independently is O, S, S(O), S(O)2, Si($R^C$)2, Ge($R^C$)2, P($R^P$), or N($R^N$), wherein independently each $R^C$ is unsubstituted (C1-C18)hydrocarbyl or the two $R^C$ are taken together to form a (C2-C19)alkylene, each $R^P$ is unsubstituted (C1-C18)hydrocarbyl; and each $R^N$ is unsubstituted (C1-C18)hydrocarbyl, a hydrogen atom or absent;

R1a, R2a, R3a, R4a, R1b, R2b, R3b, R4b, R5c, R6c, R7c, R8e, R9e, R10e, R11e, R12e, R13e, R14e, R15e, R5d, R6d, R7d, R8f, R9f, R10f, R11f, R12f, R13f, R14f and R15f are each, independently, a hydrogen atom, an unsubstituted hydrocarbyl, a substituted hydrocarbyl an unsubstituted heterohydrocarbyl, a substituted heterohydrocarbyl, or a halogen atom; and wherein two or more of R1a, R2a, R3a, R4a, R1b, R2b, R3b, R4b, R5c, R6c, R7c, R8e, R9e, R10e, R11e, R12e, R13e, R14e, R15e, R5d, R6d, R7d, R8f, R9f, R10f, R11f, R12f, R13f, R14f and R15f may, optionally, form one or more ring structures;

II) at least one co-catalyst selected from the following:
   i) a borane compound,
   ii) a borate compound,
   iii) an alkyl aluminum compound,
   iv) a combination of two or more from i) through iii);
III) at least one compound of Structure 2 below:

(Structure 2)

wherein, for Structure 2, R1, R2 and R3 are each, independently, hydrogen, an unsubstituted hydrocarbon, a substituted hydrocarbon, and/or two or more of R1, R2 and R3 may, optionally, form one or more ring structures; and wherein if R1 is hydrogen, then R2 and R3 are each not hydrogen; and if R2 is hydrogen, then R1 and R3 are each not hydrogen; and if R3 is hydrogen, then R1 and R2 are each not hydrogen; and wherein R4, R5 and R6 are each, independently, hydrogen, an unsubstituted hydrocarbon, or a substituted hydrocarbon;

B) separating the final polymer solution into at least a polymer-rich solution and a polymer-free solution; and wherein, optionally, at least a portion of the polymer-free solution is recycled back to the reactor;

C) maintaining the level of the at least one compound of Structure 2 in the at least one reactor, from 100 ppm to 10,000 ppm, based on the total content weight of the reactor; and wherein for step C), the level of the at least one compound of Structure 2 is maintained using one or more of the following features:
a) adding water to the final polymer solution, after this solution exits the at least one reactor, at a level from 0.1 to 1000 ppm, based on the total content weight of the reactor, and wherein, after the addition of the water, at least a portion of the polymer-free solution is recycled back to the reactor;
b) increasing or decreasing the level of the at least one co-catalyst of component II), and wherein, after the final polymer solution exits the at least one reactor, and at least a portion of the polymer-free solution is recycled back to the reactor;
c) adding at least one base compound to the final polymer solution, after this solution exits the at least one reactor, and wherein, after the addition of the base compound, at least a portion of the polymer-free solution is recycled back to the reactor;
d) adding at least one oil to the final polymer solution, and this solution exits the at least one reactor, and wherein, after the addition of the oil, at least a portion of the polymer-free solution is recycled back to the reactor;
e) continuously adding the compound of Structure 2 to the reactor, to maintain the level of this compound, in the reactor, from 100 ppm to 10,000 ppm, based on the total content weight of the reactor;
f) any combination of two or more from a) through e).

DETAILED DESCRIPTION

Figure 1:
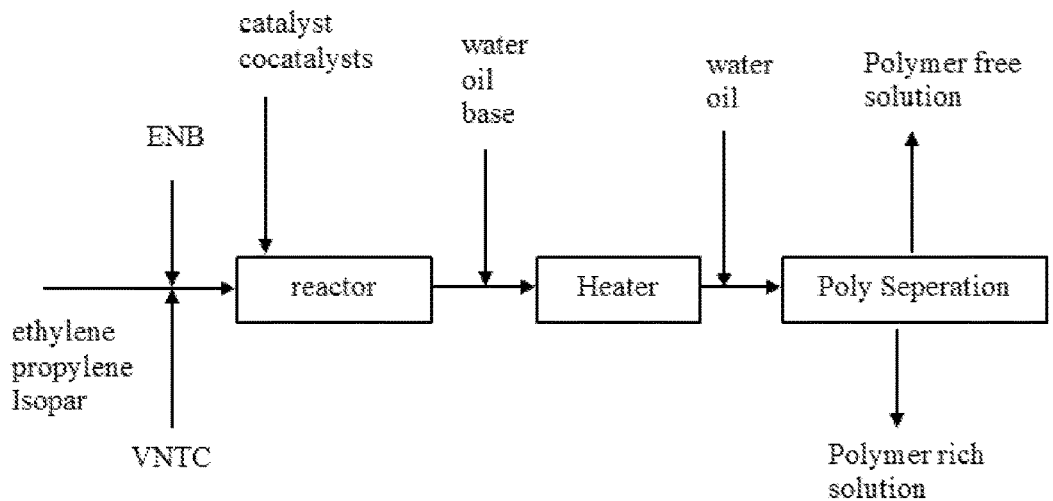
FIG. 1 depicts a schematic of a potential polymerization configuration.

It been discovered that that compounds of Structure 2 (for example, vinylnortricyclene (VNTC)) can be formed from an acid catalyzed isomerization of the respective diene monomers (for example, ethylidene norbornene (ENB)), in the polymerization solution. It has also been discovered that the acids that catalyze the isomerization can be derived from one or more of the following sources: i) the cocatalyst(s) of the polymerization process, ii) the thermally decomposed cocatalyst(s) of the polymerization process, iii) the product formed through the reaction of one or more of the cocatalysts with water, iv) the product formed through the reaction of one or more of the cocatalysts with polar impurities found in oil, and/or v) acidic species present in the oil and/or other agents added to the polymerization and/or added to the polymer solution that exits the reactor. It has also been discovered that the addition of a base, such as an amine, can be used to neutralize the acidic species formed during the polymerization, and/or neutralize the acid species present in oils or other agents added to the polymerization and/or added to the final polymer solution. It is believed that a primary source of acid is due the reaction of one or more cocatalysts with impurities in an oil. Thus the addition of a base can prevent and/or reduce diene isomerization to a compound of Structure 2.

It has also been discovered that the level of the compound of Structure 2 (for example, vinyl nortricyclene) can be varied by the deliberate isomerization of the corresponding diene (for example, ethylidene norbornene), in a separate isomerization reactor, which can then be added to the main polymerization reactor, for example, using a recycle line back to the reactor.

It has also been discovered that as an impurity in the ethylidene norbornene monomer, vinyl nortricyclene (VNTC) acts as both a chain transfer agent and a branching agent in the EPDM process, when certain high temperature bis-biphenylphenol type catalysts are utilized. Accurate measurement and control of this impurity is required to produce the desired material. By increasing or decreasing the level of vinyl nortricyclene the amount of long chain branching in the final polymer can be varied.

As discussed above, the invention provides a process to form an ethylene/α-olefin interpolymer, said process comprising at least the following steps A) through C):

A) polymerizing, in at least one reactor, at least one reaction mixture comprising ethylene and the α-olefin, in a solution polymerization, and, in the presence of at least the following components I), II) and III), to form a final polymer solution;

I) at least one compound of Structure 1 below:

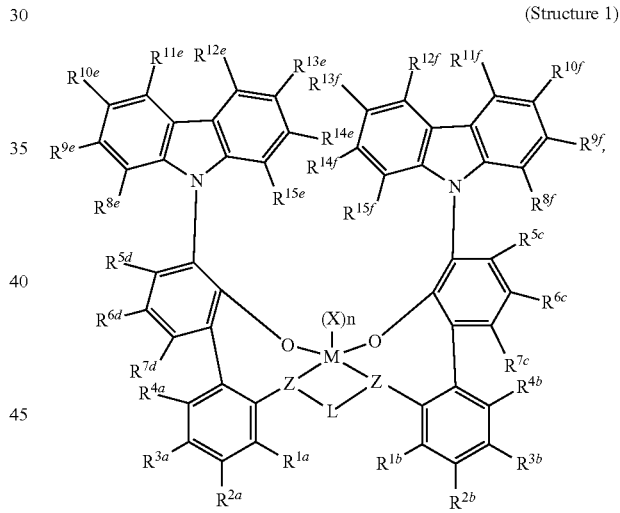

(Structure 1)

as described herein;
wherein for Structure 1:
II) at least one co-catalyst selected from the following:
   i) a borane compound,
   ii) a borate compound,
   iii) an alkyl aluminum compound,
   iv) a combination of two or more from i) through iii);
III) at least one compound of Structure 2 below:

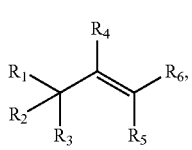

(Structure 2)

as described herein;

B) separating the final polymer solution into at least a polymer-rich solution and a polymer-free solution; and wherein, optionally, at least a portion of the polymer-free solution is recycled back to the reactor;

C) maintaining the level of the at least one compound of Structure 2 in the at least one reactor, from 100 ppm to 10,000 ppm, based on the total content weight of the reactor; and wherein for step C), the level of the at least one compound of Structure 2 is maintained using one or more of the following features:
  a) adding water to the final polymer solution, after this solution exits the at least one reactor, at a level from 0.1 to 1000 ppm, based on the total content weight of the reactor, and wherein, after the addition of the water, at least a portion of the polymer-free solution is recycled back to the reactor;
  b) increasing or decreasing the level of the at least one co-catalyst of component II), and wherein, after the final polymer solution exits the at least one reactor, and at least a portion of the polymer-free solution is recycled back to the reactor;
  c) adding at least one base compound to the final polymer solution, after this solution exits the at least one reactor, and wherein, after the addition of the base compound, at least a portion of the polymer-free solution is recycled back to the reactor;
  d) adding at least one oil to the final polymer solution, and this solution exits the at least one reactor, and wherein, after the addition of the oil, at least a portion of the polymer-free solution is recycled back to the reactor;
  e) continuously adding the compound of Structure 2 to the reactor, to maintain the level of this compound, in the reactor, from 100 ppm to 10,000 ppm, based on the total content weight of the reactor;
  f) any combination of two or more from a) through e).

An inventive process may comprise a combination of two or more embodiments as described herein.

The ethylene/α-olefin interpolymer may comprise a combination of two or more embodiments as described herein.

The compound of Structure 1 may comprise a combination of two or more embodiments as described herein.

The compound of Structure 2 may comprise a combination of two or more embodiments as described herein.

As used herein, R1a=$R^{1a}$, R2a=$R^{2a}$, R3a=$R^{3a}$, and so forth. As known in the art, O is oxygen, S is sulfur, Si is silicon, and so forth.

As used herein, R1=$R_1$, R2=$R_2$, R3=$R_3$, and so forth.

In one embodiment, the process further comprises monitoring the level of the at least one compound of Structure 2 in the polymer-free solution. For example, the level of the compound of Structure can be monitored by Gas Chromatography (GC), NMR and/or IR. For example, aliquots of the polymer free solution can be sampled at various time points, and the level of Structure 2 determined, and/or aliquots of the polymer solution can be sampled at various time points, and the level of Structure 2 determined.

In one embodiment, for step A), the at least one compound of Structure 2 is added to the at least one reactor in an amount from 100 ppm to 10,000 ppm, further from 150 to 5,000 ppm, further from 200 to 1,000 ppm, based on the total content weight of the reactor. For example, the level of the compound of Structure 2 can be monitored by Gas Chromatography (GC), NMR and/or IR.

In one embodiment, the at least one compound of Structure 2 is formed in-situ, in the reactor, from isomerization of a diene.

In one embodiment, the level of the at least one compound of Structure 2 in the at least one reactor is maintained at an amount from 100 ppm to 10,000 ppm, based on the total content weight of the reactor. For example, the level of the compound of Structure 2 can be monitored by Gas Chromatography (GC), NMR and/or IR.

In one embodiment, for step A), the at least one co-catalyst is added to the at least one reactor, in an amount from 0.1 to 100 ppm, based on the total content weight of the reactor.

In one embodiment, for step C), at least one base compound is added to the final polymer solution, in an amount from 10 ppm to 5000 ppm, or from 10 ppm to 2000 ppm, or from 10 ppm to 1000 ppm, based on the total content weight of the reactor.

In one embodiment, for step C), at least one oil is added to the final polymer solution, before the polymer solution enters a separator.

In one embodiment, the final polymer solution is subject to a thermal treatment, prior to step B).

In one embodiment, the at least one oil is added to the polymer solution, before the polymer solution enters a separator. In a further embodiment, the at least one oil is added in an amount from 0.5 wt % to 25 wt %, based on the total content weight of the reactor.

In one embodiment, the at least one oil is added to the polymer solution, before the polymer solution enters a separator. In a further embodiment, the at least one oil is added in an amount from 0.1 lb/hr to 1.0 lb/hr, or from 0.3 lb/hr to 0.9 lb/hr, or from 0.5 lb/hr to 0.7 lb/hr.

In one embodiment, for Structure 2, R1, R2 and R3 are each, independently, an unsubstituted hydrocarbon, and/or two or more of R1, R2 and R3 may form one or more ring structures.

In one embodiment, for Structure 2, R1, R2 and R3 are each, independently, an alkyl, and/or two or more of R1, R2 and R3 may form one or more ring structures.

In one embodiment, for Structure 2, R1, R2 and R3 are each, independently, a C1-C6 alkyl, further a C1-C4 alkyl, further a C1-C2 alkyl, and/or two or more of R1, R2 and R3 may form one or more ring structures.

In one embodiment, for Structure 2, R4, R5 and R6 are each, independently, hydrogen or an unsubstituted hydrocarbon.

In one embodiment, for Structure 2, R4, R5 and R6 are each, independently, hydrogen or an alkyl, or are each, independently, hydrogen or a C1-C6 alkyl, or a C1-C4 alkyl, or a C1-C2 alkyl.

In one embodiment, Structure 2 is selected from the following compounds 1b through 34b:

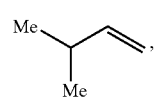

1b

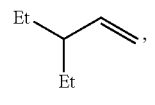

2b

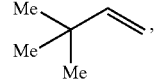

3b

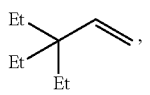
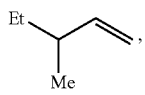
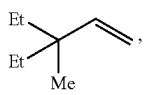
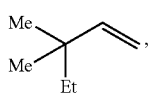
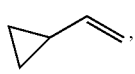
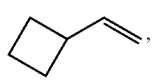
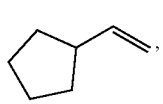
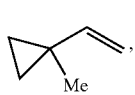
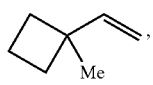
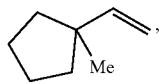
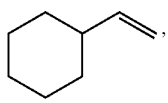
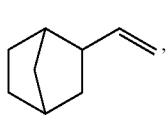
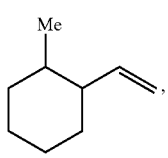
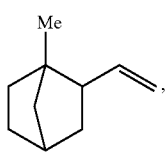
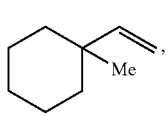
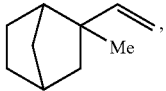
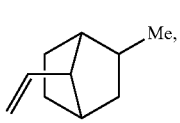
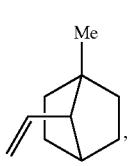
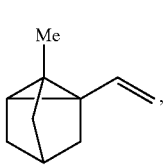
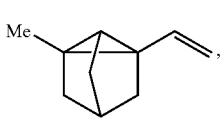
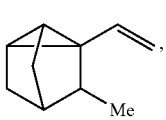
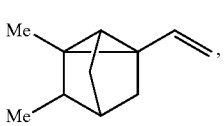
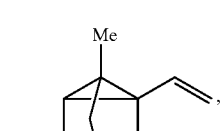
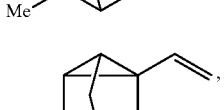
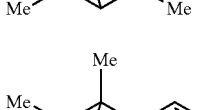
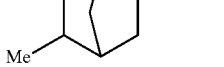

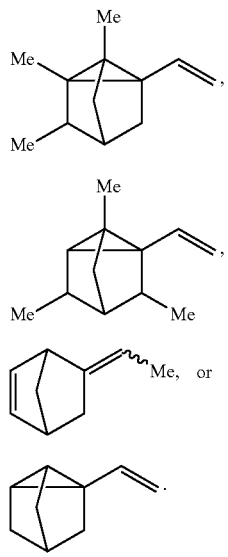

In one embodiment, Structure 2 is selected from compounds 13b through 34b, and further from compounds 24b through 34b.

In one embodiment, for Structure 1, n=2.

In one embodiment, for Structure 1, each X is, independently, and alkyl.

In one embodiment, for Structure 1, each Z is oxygen.

In one embodiment, for Structure 1, L is selected from the following: —CH2CH2CH2CH2CH2CH2—, —CH2CH2CH2CH2CH2—, —CH2CH2CH2CH2—, —CH2CH2CH2—, —CH2CH2— or —CH2—.

In one embodiment, for Structure 1, L is selected from the following: —CH2CH2CH2, —CH2CH2— or —CH2—; and further —CH2CH2— or —CH2—, and further —CH2—.

In one embodiment, for Structure 1, M is hafnium.

In one embodiment, for Structure 1, R3a and R3b are each, independently, is a halogen atom. In a further embodiment, R3a and R3b are each, independently Br, F, or Cl, and preferably the F or Cl.

In one embodiment, for Structure 1, R6c and R6d are each, independently, an alkyl, further a C1-C20 alkyl, further a C1-C15 alkyl, further a C1-C10 alkyl, further a C1-C8 alkyl.

In one embodiment, for Structure 1, R10e and R10f are each, independently, an alkyl, further a C1-C12 alkyl, further a C1-C10 alkyl, further a C1-C8 alkyl, further a C1-C6 alkyl, further a C1-C4 alkyl.

In one embodiment, for Structure 1, R13e and R13f are each, independently, an alkyl, further a C1-C12 alkyl, further a C1-C10 alkyl, further a C1-C8 alkyl, further a C1-C6 alkyl, further a C1-C4 alkyl.

In one embodiment, for Structure 1, R1a, R2a, R4a, R1b, R2b, R4b, R5c, R7c, R8e, R9e, R11e, R12e, R14e, R15e, R5d, R7d, R8f, R9f, R11f, R12f, R14f and R15f are each hydrogen.

In one embodiment, Structure 1 is selected from the following compounds 1A through 10A:

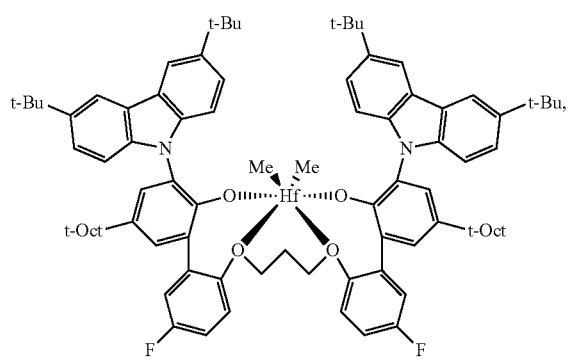

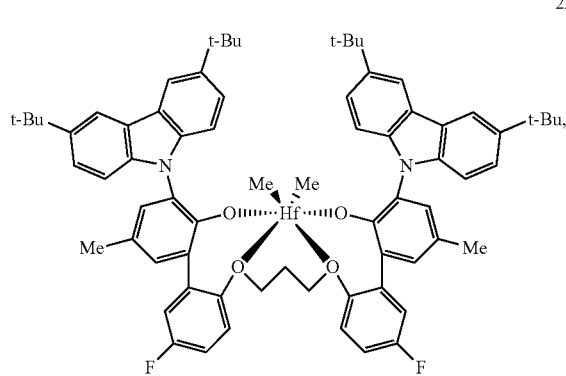

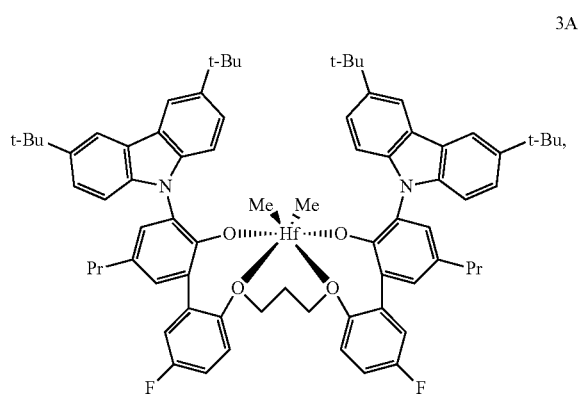

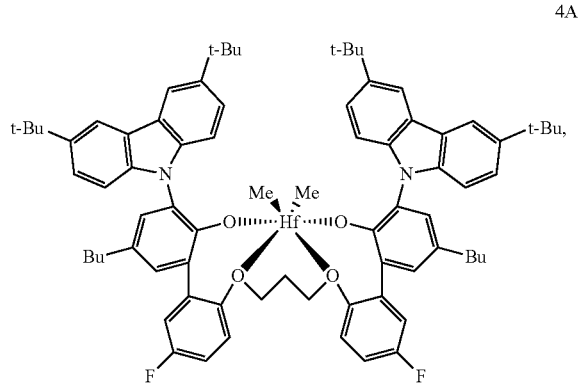

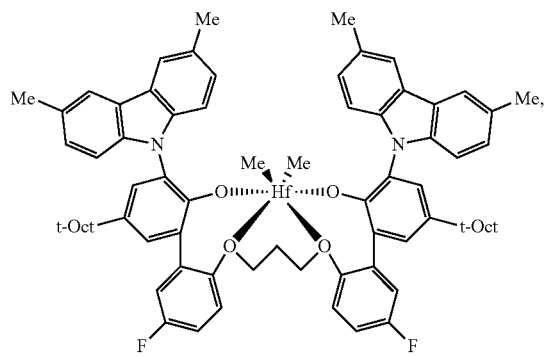

5A

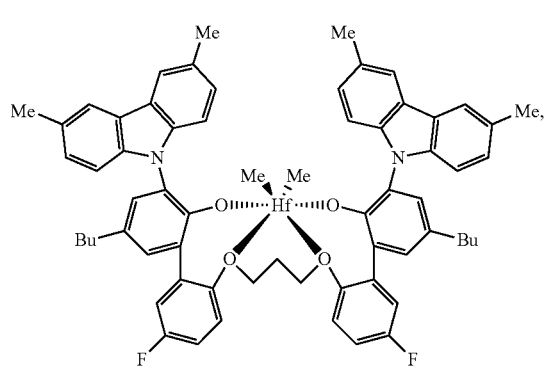

6A

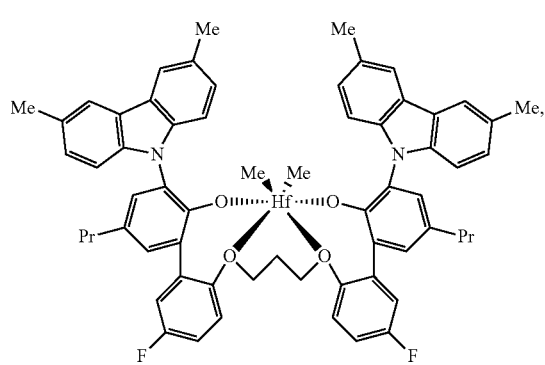

7A

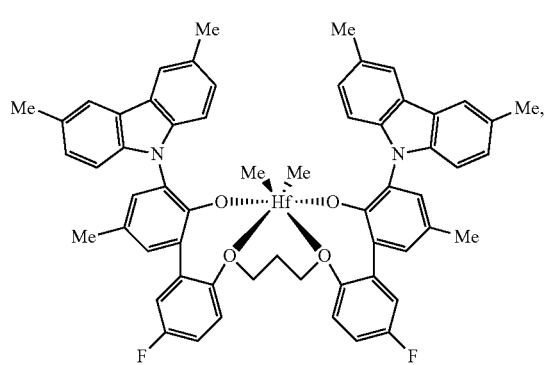

8A

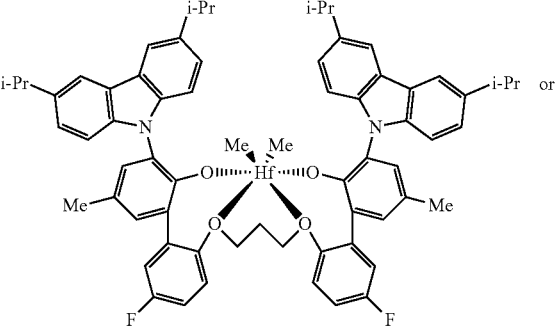

9A

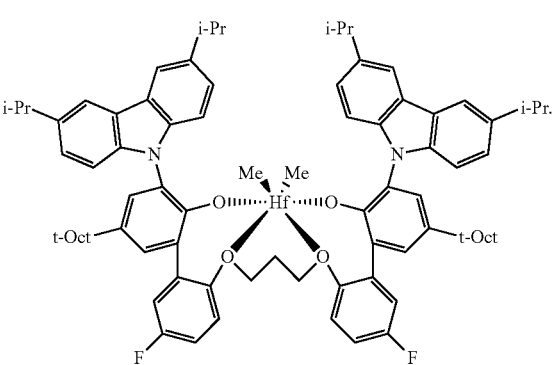

10A

In one embodiment, for Structure 1, each (C1-C40)hydrocarbyl is not substituted, and each (C1-C40)heterohydrocarbyl is not substituted.

In one embodiment, for Structure 1, at least one (C1-C40) hydrocarbyl, and/or at least one (C1-C40)heterohydrocarbyl is, independently, substituted with at least on RS substituent, and wherein each RS substituent is, independently, selected from the following: a halogen atom, a polyfluoro substituent, a perfluoro substituent, F$_3$C—, FCH$_2$O—, F$_2$HCO—, F$_3$CO—, (R$^C$)$_3$Si—, (R$^C$)$_3$Ge, (R$^C$)O—, (R$^C$)S—, (R$^C$)S(O)—, (R$^C$)S(O)$_2$—, (R$^C$)$_2$P—, (R$^C$)$_2$N—, (R$^C$)$_2$C=N—, NC—, (R$^C$)C(O)O—, (R$^C$)OC(O)—, (R$^C$)C(O)N(R$^C$)—, or (R$^C$)$_2$NC(O)—; and wherein each R$^C$ is independently a substituted or unsubstituted (C1-C30)hydrocarbyl, or a substituted or unsubstituted (C1-C30) heterohydrocarbyl; or wherein each (C1-C40)hydrocarbyl, and each (C1-C40) heterohydrocarbyl is, independently, substituted with an unsubstituted(C1-C18)-alkylene.

In one embodiment, for Structure 1, two or more of R1a, R2a, R3a, R4a, R1b, R2b, R3b, R4b, R5c, R6c, R7c, R8e, R9e, R10e, R11e, R12e, R13e, R14e, R15e, R5d, R6d, R7d, R8f, R9f, R10f, R11f, R12f, R13f, R14f and R15f do not form one or more ring structures.

M is titanium, zirconium, or hafnium. In one embodiment, M is zirconium or hafnium, and in another embodiment M is hafnium. In some embodiments, M is in a formal oxidation state of +2, +3, or +4, In some embodiments, n is 0, 1, 2, or 3, Each X independently is a monodentate ligand that is neutral, monoanionic, or dianionic; or two Xs are taken together to form a bidentate ligand that is neutral, monoanionic, or dianionic. X and n are chosen in such a way that the metal-ligand complex of Structure 1 is, overall, neutral. In some embodiments each X independently is the monodentate ligand. In one embodiment, when there are two or more X monodentate ligands, each X is the same. In some embodiments the monodentate ligand is the monoanionic ligand. The monoanionic ligand has a net formal oxidation state of −1, Each monoanionic ligand may independently be hydride, (C1-C40)hydrocarbyl carbanion, (C1-C40)heterohydrocarbyl carbanion, halide, nitrate, HC(O)O—, (C1-C40)hydrocarbylC(O)O—, HC(O)N(H)—, (C1-C40)hydrocarbylC(O)N(H)—, (C1-C40)hydrocarbylC(O)N((C1-C20)hydrocarbyl)-, $R^K R^L B^-$, $R^K R^L N^-$, $R^K O^-$, $R^K S^-$, $R^K R^L P^-$, or $R^M R^K R^L Si^-$, wherein each $R^K$, $R^L$, and $R^M$ independently is hydrogen, (C1-C40)hydrocarbyl, or (C1-C40)heterohydrocarbyl, or $R^K$ and $R^L$ are taken together to form a (C2-C40) hydrocarbylene or (C1-C40)heterohydrocarbylene and $R^M$ is as defined above.

In one embodiment, for Structure 1, each X is the same, wherein each X is methyl; ethyl; 1-propyl; 2-propyl; 1-butyl; 2,2,-dimethylpropyl; trimethylsilylmethyl; phenyl; benzyl; or chloro. In some embodiments n is 2 and each X is the same.

In one embodiment, for Structure 1, at least two X are different. In some embodiments, n is 2 and each X is a different one of methyl; ethyl; 1-propyl; 2-propyl; 1-butyl; 2,2,-dimethylpropyl; trimethylsilylmethyl; phenyl; benzyl; and chloro.

The integer n indicates number of X. In one embodiment, n is 2 or 3 and at least two X independently are monoanionic monodentate ligands and a third X, if present, is a neutral monodentate ligand. In some embodiments n is 2 at two X are taken together to form a bidentate ligand. In some embodiments, the bidentate ligand is 2,2-dimethyl-2-silapropane-1,3-diyl or 1,3-butadiene.

In one embodiment, for for Structure 1, M is hafnium; and each Z is an oxygen atom.

In one embodiment, for for Structure 1, M is zirconium or hafnium, and further hafnium; n is 2; each X, independently, is a (C1-C40)hydrocarbyl, a (C1-C40)heterohydrocarbyl, or a halide; and R1a, R2a, R4a, R1b, R2b, R4b, R5c, R7c, R8e, R9e, R11e, R12e, R14e, R15e, R5d, R7d, R8f, R9f, R11f, R12f, R14f and R15f are each hydrogen In one embodiment, for Structure 1 each X is, independently, a (C1-C40)-hydrocarbyl, a (C1-C40)-heterohydrocarbyl, or a halide. In a further embodiment both X are the same.

In one embodiment, for Structure 1, each X is, independently, a (C1-C40)-hydrocarbyl, or a halide. In a further embodiment both X are the same.

In one embodiment, for Structure 1, each X is, independently, a (C1-C40)-hydrocarbyl. In a further embodiment, both X groups are the same.

In one embodiment, for Structure 1, each X is, independently, a (C1-C3)alkyl, further ethyl or methyl, and further methyl. In a further embodiment both X are the same.

The metal-ligand complex of Structure 1 is described herein using conventional chemical group terminology. When used to describe certain carbon atom-containing chemical groups (e.g., ($C_1$-$C_{40}$)alkyl), the parenthetical expression ($C_1$-$C_{40}$) can be represented by the form "($C_x$-$C_y$)," which means that the unsubstituted version of the chemical group comprises from a number x carbon atoms to a number y carbon atoms, wherein each x and y independently is an integer as described for the chemical group.

The term "substituted," as used herein, with respect to a chemical compound, refers to a substituent that comprises at least one heteroatom (for example, O, S, N, P, etc.). Substituents include, but are not limited to, the RS substituents, as noted above, as the following: a halogen atom, a polyfluoro substituent, a perfluoro substituent, $F_3C$—, $FCH_2O$—, $F_2HCO$—, $F_3CO$—, $(R^C)_3Si$—, $(R^C)_3Ge$—, $(R^C)O$—, $(R^C)S$—, $(R^C)S(O)$—, $(R^C)S(O)_2$—, $(R^C)_2P$—, $(R^C)_2N$—, $(R^C)_2C{=}N$—, $NC$—, $(R^C)C(O)O$—, $(R^C)OC(O)$—, $(R^C)C(O)N(R^C)$—, and $(R^C)_2NC(O)$—; wherein $R^C$ is described above.

The term "unsubstituted," as used herein, with respect to a chemical compound, refers to the lack of a substituent that comprises at least one heteroatom (for example, O, S, N, P, etc.).

The term "hydrocarbyl," as used herein, refers to a monovalent (monoradical or radical) chemical group containing only hydrogen and carbon atoms.

The term "substituted hydrocarbyl," as used herein, refers to a hydrocarbyl, in which at least one hydrogen atom is substituted with a substituent that comprises at least one heteroatom. Heteroatoms include, but are not limited to, O, N, P and S.

The term "heterohydrocarbyl," as used herein, refers to a hydrocarbyl, in which at least one carbon atom, or CH group, or CH2 group, is substituted with a heteroatom or a chemical group containing at least one heteroatom. Heteroatoms include, but are not limited to, O, N, P and S.

The term "substituted heterohydrocarbyl," as used herein, refers to a heterohydrocarbyl in which at least one hydrogen atom is substituted with a substituent that comprises at least one heteroatom. Heteroatoms include, but are not limited to, O, N, P and S.

The term "hydrocarbylene," as used herein, refers to a divalent (diradical) chemical group containing only hydrogen and carbon atoms.

The term "substituted hydrocarbylene," as used herein, refers to a hydrocarbylene, in which at least one hydrogen atom is substituted with a substituent that comprises at least one heteroatom. Heteroatoms include, but are not limited to, O, N, P and S.

The term "heterohydrocarbylene," as used herein, refers to a hydrocarbylene, in which at least one carbon atom, or CH group, or CH2 group, is substituted with a heteroatom or a chemical group containing at least one heteroatom. Heteroatoms include, but are not limited to, O, N, P and S.

The term "substituted heterohydrocarbylene," as used herein, refers to a heterohydrocarbylene, in which at least one hydrogen atom is substituted with a substituent that comprises at least one heteroatom. Heteroatoms include, but are not limited to, O, N, P and S.

The term "halogen atom," as used herein, refers to fluorine atom (F), chlorine atom (Cl), bromine atom (Br), or iodine atom (I) radical. Preferably each halogen atom independently is the Br, F, or Cl radical, and more preferably the F or Cl radical. The term "halide" refers to fluoride (F—), chloride (Cl—), bromide (Br—), or iodide (I—) anion. Preferably, there are no O—O, S—S, or O—S bonds, other than O—S bonds in an S(O) or S(O)$_2$ diradical functional group, in the metal-ligand complex of Structure 1, More preferably, there are no O—O, N—N, P—P, N—P, S—S, or O—S bonds, other than O—S bonds in an S(O) or S(O)$_2$ diradical functional group, in the metal-ligand complex of Structure 1.

In one embodiment, the polymerization is a continuous solution polymerization.

In one embodiment, the polymerization takes place in one reactor or in two reactors. In a further embodiment, the polymerization takes place in one reactor. In another embodiment, the polymerization takes place in two reactors.

In one embodiment, the polymerization takes place at a temperature from 80° C. to 200° C., or from 80° C. to 180° C., or from 100° C. to 160° C.

In one embodiment, the process comprises polymerizing the one or more reaction mixture(s) in one reactor or in two reactors. For example one or more polymerization reactors, connected in parallel, series or combinations thereof. In a further embodiment the reactor temperature in at least one reactor is from 80° C. to 200° C., or from 80° C. to 180° C., or from 100° C. to 160° C.

In one embodiment, one or more co-catalysts are used in an inventive process. Suitable cocatalysts for use include alkyl aluminum compounds, such as polymeric or oligomeric aluminoxanes, especially methyl aluminoxane, as well as inert, compatible, noncoordinating, ion forming compounds. Exemplary suitable cocatalysts include, but are not limited to modified methyl aluminoxane (MMAO), bis(hydrogenated tallow alkyl)methyl, tetrakis(pentafluorophenyl)borate(1-) amine, triethyl aluminum (TEA), and any combinations thereof.

In one embodiment, the catalyst system further comprises at least one cocatalyst selected from a borate compound, an alkyl aluminum compound, or a combination thereof. In a further embodiment, the alkyl aluminum compound is an aluminoxane.

In one embodiment, the ethylene/α-olefin interpolymer is an ethylene/α-olefin/non-conjugated polyene interpolymer, further an ethylene/α-olefin/diene interpolymer (EAODM), and further an EPDM.

In one embodiment, the ethylene/α-olefin interpolymer comprises a majority weight percent of polymerized ethylene, based on the weight of the interpolymer. In a further embodiment, the ethylene/α-olefin interpolymer is an ethylene/α-olefin/non-conjugated polyene interpolymer, further an ethylene/α-olefin/diene interpolymer (EAODM), and further an EPDM.

In one embodiment, the ethylene/α-olefin interpolymer is an ethylene/α-olefin copolymer.

The invention also provides an ethylene/α-olefin interpolymer formed by an inventive process as described herein.

In one embodiment, the ethylene/α-olefin interpolymer is an ethylene/α-olefin/non-conjugated polyene interpolymer, further an ethylene/α-olefin/diene interpolymer (EAODM), and further an EPDM. In a further embodiment, the interpolymer comprises a majority weight percent of polymerized ethylene, based on the weight of the interpolymer.

In one embodiment, the ethylene/α-olefin interpolymer is an ethylene/α-olefin copolymer, and further an ethylene/C3-C10 alpha-olefin copolymer, and further an ethylene/C3-C8 alpha-olefin copolymer.

The invention also provides an ethylene/α-olefin interpolymer that comprises one or more units derived from at least one compound of Structure 2 below:

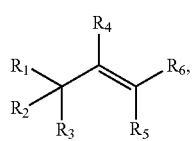

(Structure 2)

wherein, for Structure 2, R1, R2 and R3 are each, independently, hydrogen, an unsubstituted hydrocarbon, a substituted hydrocarbon, and/or two or more of R1, R2 and R3 may, optionally, form one or more ring structures; and wherein if R1 is hydrogen, then R2 and R3 are each not hydrogen; and if R2 is hydrogen, then R1 and R3 are each not hydrogen; and if R3 is hydrogen, then R1 and R2 are each not hydrogen; and wherein R4, R5 and R6 are each, independently, hydrogen, an unsubstituted hydrocarbon, or a substituted hydrocarbon; and wherein the ethylene/α-olefin interpolymer has a tan delta (at 190° C.) greater than, or equal to, 0.50, or greater than, or equal to, 1.00, or greater than, or equal to, 1.50, and a rheology ratio (V0.1/V100, each at 190° C.) less than, or equal to, 150.0, or less than, or equal to, 100.0, or less than, or equal to, 50.0.

In one embodiment, the interpolymer has a tan delta (at 190° C.) less than, or equal to, 3.50, or less than, or equal to, 3.00, or less than, or equal to, 2.70, or less than, or equal to, 2.50.

In one embodiment, the interpolymer has a rheology ratio (V0.1/V100, each at 190° C.) greater than, or equal to, 5.0, or greater than, or equal to, 8.0, or greater than, or equal to, 10.0.

In one embodiment, the interpolymer has a Mw from 100,000 to 500,000 g/mole, or from 100,000 to 400,000 g/mole, or from 100,000 to 300,000 g/mole, as determined by conventional GPC.

In one embodiment, the ethylene/α-olefin interpolymer has a MWD from 2.30 to 2.80.

In one embodiment, the ethylene/α-olefin interpolymer is an ethylene/α-olefin/non-conjugated polyene interpolymer, further an ethylene/α-olefin/diene interpolymer (EAODM), and further an EPDM.

In one embodiment, the ethylene/α-olefin interpolymer is an ethylene/α-olefin copolymer, and further an ethylene/C3-C10 alpha-olefin copolymer.

The invention also provides an ethylene/α-olefin copolymer, and further an ethylene/C1-C10 alpha-olefin copolymer that comprises one or more units derived from at least one compound of Structure 2 below:

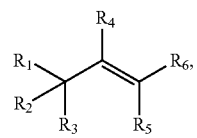

(Structure 2)

wherein, for Structure 2, R1, R2 and R3 are each, independently, hydrogen, an unsubstituted hydrocarbon, a substituted hydrocarbon, and/or two or more of R1, R2 and R3 may, optionally, form one or more ring structures; and wherein if R1 is hydrogen, then R2 and R3 are each not hydrogen; and if R2 is hydrogen, then R1 and R3 are each not hydrogen; and if R3 is hydrogen, then R1 and R2 are each not hydrogen; and wherein R4, R5 and R6 are each, independently, hydrogen, an unsubstituted hydrocarbon, or a substituted hydrocarbon.

In one embodiment, the ethylene/α-olefin copolymer has a tan delta (at 190° C.) greater than, or equal to, 0.50, or greater than, or equal to, 1.00, or greater than, or equal to, 1.50, and a rheology ratio (V0.1/V100, each at 190° C.) less than, or equal to, 150.0, or less than, or equal to, 100.0, or less than, or equal to, 50.0.

In one embodiment, the ethylene/α-olefin copolymer has a tan delta (at 190° C.) less than, or equal to, 3.50, or less than, or equal to, 3.00, or less than, or equal to, 2.70, or less than, or equal to, 2.50.

In one embodiment, the ethylene/α-olefin copolymer has a rheology ratio (V0.1/V100, each at 190° C.) greater than, or equal to, 5.0, or greater than, or equal to, 8.0, or greater than, or equal to, 10.0.

The invention also provides a composition comprising an inventive ethylene/α-olefin interpolymer, as described herein.

The invention also provides an article comprising at least one component formed from an inventive composition described herein.

Ethylene/α-olefin Interpolymer

In one embodiment, the ethylene/α-olefin interpolymer has a tan delta (0.1 rad/sec, 190° C.) greater than, or equal to, 0.50, or greater than, or equal to, 0.80, or greater than, or equal to, 1.00, or greater than, or equal to, 1.20, or greater than, or equal to, 1.50, or greater than, or equal to, 1.55, or greater than, or equal to, 1.60, or greater than, or equal to, 1.65, or greater than, or equal to, 1.70.

In one embodiment, the ethylene/α-olefin interpolymer has a tan delta (0.1 rad/sec, 190° C.) less than, or equal to, 6.00, or less than, or equal to, 5.50, or less than, or equal to, 5.00, or less than, or equal to, 4.50, or less than, or equal to, 4.00, or than, or equal to, 3.50, or less than, or equal to, 3.20, or less than, or equal to, 3.00, or less than, or equal to, 2.80, or less than, or equal to, 2.50.

In one embodiment, the ethylene/α-olefin interpolymer has a V0.1/V100 less than, or equal to, 150.0, or less than, or equal to, 120.0, or less than, or equal to, 100.0, or less than, or equal to, 70.0, or than, or equal to, 50.0, or less than, or equal to, 45.0, or less than, or equal to, 40.0, or less than, or equal to, 35.0, or than, or equal to, 30.0, or less than, or equal to, 25.0, or less than, or equal to, 20.0.

In one embodiment, the ethylene/α-olefin interpolymer has a V0.1/V100 greater than, or equal to, 5.0, or greater than, or equal to, 8.0, or greater than, or equal to, 10.0, or greater than, or equal to, 12.0.

In one embodiment, the ethylene/α-olefin interpolymer has a weight average molecular weight (Mw) greater than, or equal to, 120,000 g/mole, or greater than, or equal to, 130,000 g/mole, or greater than, or equal to, 140,000 g/mole, or greater than, or equal to, 150,000 g/mole, as determined by conventional GPC.

In one embodiment, the ethylene/α-olefin interpolymer has a weight average molecular weight (Mw) less than, or equal to, 500,000 g/mole, or less than, or equal to, 400,000 g/mole, or less than, or equal to, 300,000 g/mole, as determined by conventional GPC.

In one embodiment, the ethylene/α-olefin interpolymer has a molecular weight distribution (MWD) from 2.00 to 3.00, or from 2.10 to 2.090, or from 2.20 to 2.80, as determined by conventional GPC.

In one embodiment, the ethylene/α-olefin interpolymer has a Mooney viscosity, ML(1+4) at 125° C., greater than, or equal to, 10, further greater than, or equal to, 15, further greater than, or equal to 20.

In one embodiment, the ethylene/α-olefin interpolymer has a Mooney viscosity, ML(1+4) at 125° C., less than 100, or less than, or equal to, 80, or less than, or equal to, 60.

In one embodiment, the ethylene/α-olefin interpolymer has density from 0.865 to 0.910 g/cc, or from 0.870 to 0.900 g/cc, or from 0.875 to 0.890 g/cc (1 cc=1 cm$^3$).

In one embodiment, the ethylene/α-olefin interpolymer is an ethylene/α-olefin/non-conjugated polyene interpolymer, further an ethylene/α-olefin/diene interpolymer (EAODM). In a further embodiment, the interpolymer is an EPDM. In a further embodiment, the diene is ENB.

In one embodiment, the ethylene/α-olefin interpolymer is an ethylene/α-olefin copolymer, and further an ethylene/C3-C10 alpha-olefin copolymer.

The α-olefin may be either an aliphatic or an aromatic compound. The α-olefin is preferably a C3-C20 aliphatic compound, preferably a C3-C16 aliphatic compound, and more preferably a C3-C10 aliphatic compound. Preferred C3-C10 aliphatic α-olefins are selected from the group consisting of propylene, 1-butene, 1-hexene and 1-octene, and more preferably propylene. In a further embodiment, the interpolymer is an ethylene/propylene/diene (EPDM) terpolymer. In a further embodiment, the diene is 5-ethylidene-2-norbornene (ENB).

Illustrative non-conjugated polyenes include straight chain acyclic dienes, such as 1,4-hexadiene and 1,5-heptadiene; branched chain acyclic dienes, such as 5-methyl-1,4-hexadiene, 2-methyl-1,5-hexadiene, 6-methyl-1,5-heptadiene, 7-methyl-1,6-octadiene, 3,7-dimethyl-1,6-octadiene, 3,7-dimethyl-1,7-octadiene, 5,7-dimethyl-1,7-octadiene, 1,9-decadiene, and mixed isomers of dihydromyrcene; single ring alicyclic dienes such as 1,4-cyclohexadiene, 1,5-cyclooctadiene and 1,5-cyclododecadiene; multi-ring alicyclic fused and bridged ring dienes, such as tetrahydroindene, methyl tetrahydroindene; alkenyl, alkylidene, cycloalkenyl and cycloalkylidene norbornenes such as 5-methylene-2-norbornene (MNB), 5-ethylidene-2-norbornene (ENB), 5-vinyl-2-norbornene, 5-propenyl-2-norbornene, 5-isopropylidene-2-norbornene, 5-(4-cyclopentenyl)-2-norbornene, and 5-cyclohexylidene-2-norbornene. The polyene is preferably a non-conjugated diene selected from the group consisting of ENB, dicyclopentadiene, 1,4-hexadiene, 7-methyl-1,6-octadiene, and preferably, ENB, dicyclopentadiene and 1,4-hexadiene, more preferably ENB and dicyclopentadiene, and even more preferably ENB.

In one embodiment, the ethylene/α-olefin interpolymer is an ethylene/α-olefin/non-conjugated polyene interpolymer which comprises a majority amount of polymerized ethylene, based on the weight of the interpolymer. In a further embodiment, the ethylene/α-olefin/non-conjugated polyene interpolymer is an ethylene/α-olefin/diene interpolymer. In a further embodiment, the interpolymer is an EPDM. In a further embodiment, the diene is ENB.

In one embodiment, the final polymer solution comprises two ethylene/α-olefin interpolymers, and further two ethylene/α-olefin/non-conjugated polyene interpolymers, and wherein the interpolymers differ in one or more of the following properties: Mw, Mn, MWD, V0.1, V100, V0.1/V100, density and/or Mooney Viscosity. In a further embodiment, each ethylene/α-olefin/non-conjugated polyene interpolymer is an ethylene/α-olefin/diene interpolymer (EAODM). In a further embodiment, each interpolymer is an EPDM. In a further embodiment, each diene is ENB.

In one embodiment, the final polymer solution comprises two ethylene/α-olefin interpolymers, and further two ethylene/α-olefin copolymers, further two ethylene/(C3-C10 α-olefins copolymers, and wherein the copolymers differ in one or more of the following properties: Mw, Mn, MWD, V0.1, V100, V0.1/V100, density and/or Mooney Viscosity.

An ethylene/alpha-olefin interpolymer may comprise a combination of two or more embodiments as described herein.

An ethylene/alpha-olefin/non-conjugated polyene interpolymer may comprise a combination of two or more embodiments as described herein.

An ethylene/alpha-olefin/diene interpolymer may comprise a combination of two or more embodiments as described herein.

An EPDM terpolymer may comprise a combination of two or more embodiments as described herein.

An ethylene/alpha-olefin copolymer may comprise a combination of two or more embodiments as described herein.

Compositions and Applications

An inventive composition may comprise one or more additional additives. Suitable additives include, but are not limited to, fillers, antioxidants, UV stabilizers, flame retardants, colorants or pigments, and combinations thereof.

In one embodiment, the composition further comprises a crosslinking agent. Crosslinking agents include, but are not limited to, sulfur-containing compounds, such as elemental sulfur, 4,4'-dithiodimorpholine, thiuram di-and polysulfides, alkylphenol disulfides, and 2-morpholino-dithiobenzothiazole; peroxides, such as di-tertbutyl peroxide, tertbutylcumyl peroxide, dicumyl peroxide, 2,5-dimethyl-2,5-di-(tertbutylperoxy) hexane, di-(tertbutylperoxyisopropyl) benzene, tertbutyl peroxybenzoate and 1,1-di-(tertbutylperoxy)-3,3,5-trimethylcyclohexane. The invention also provides a crosslinked composition formed from an inventive composition of one or more embodiments described herein.

In one embodiment, the composition further comprises an oil. Oils include, but are not limited to, petroleum oils, such as aromatic and naphthenic oils; polyalkylbenzene oils; organic acid monoesters.

In one embodiment, an inventive composition further comprises a filler. Suitable fillers include, but are not limited to, clay, CaCO3, talc, carbon black, and mineral fibers.

In one embodiment, an inventive composition further comprises a thermoplastic polymer. Polymers, include, but not limited to, propylene-based polymers, ethylene-base polymers, and olefin multi-block interpolymers. Suitable ethylene-base polymers include, but are not limited to, high density polyethylene (HDPE), linear low density polyethylene (LLDPE), very low density polyethylene (VLDPE), ultra low density polyethylene (ULDPE), homogeneously branched linear ethylene polymers, and homogeneously branched substantially linear ethylene polymers (that is homogeneously branched long chain branched ethylene polymers).

In one embodiment, the composition comprises greater than, or equal to, 90 weight percent, or greater than, or equal to, 95 weight percent, or greater than, or equal to, 98 weight percent, or greater than, or equal to, 99 weight percent, of the ethylene/α-olefin interpolymer, based on the weight of the composition. In a further embodiment, the ethylene/α-olefin interpolymer is an ethylene/α-olefin/non-conjugated polyene interpolymer, and further an ethylene/α-olefin/diene interpolymer (EAODM). In a further embodiment, the interpolymer is an EPDM. In a further embodiment, the diene. In another embodiment, the ethylene/α-olefin interpolymer is an ethylene/α-olefin copolymer, and further an ethylene/C3-C10 α-olefin copolymer, and further an ethylene/C3-C10 α-olefin copolymer.

In one embodiment, the composition comprises greater than, or equal to, 90 weight percent, or greater than, or equal to, 95 weight percent, or greater than, or equal to, 98 weight percent, or greater than, or equal to, 99 weight percent, of two ethylene/α-olefin interpolymers, based on the weight of the composition. In a further embodiment, the interpolymers differ in one or more of the following properties: Mw, Mn, MWD, V0.1, V100, V0.1/V100, density and/or Mooney Viscosity. In a further embodiment, each ethylene/α-olefin interpolymer is an ethylene/α-olefin/non-conjugated polyene interpolymer, and further an ethylene/α-olefin/diene interpolymer (EAODM). In a further embodiment, each interpolymer is an EPDM. In a further embodiment, each diene is ENB.

In one embodiment, the composition comprises greater than, or equal to, 90 weight percent, or greater than, or equal to, 95 weight percent, or greater than, or equal to, 98 weight percent, or greater than, or equal to, 99 weight percent, of two ethylene/α-olefin interpolymers, and further two ethylene/α-olefin copolymers, based on the weight of the composition. In a further embodiment, the copolymers differ in one or more of the following properties: Mw, Mn, MWD, V0.1, V100, V0.1/V100, density and/or Mooney Viscosity. In a further embodiment, each ethylene/α-olefin copolymer is an ethylene/C3-C10 α-olefin copolymer, and further an ethylene/C3-C10 alpha-olefin copolymer.

The invention also provides an article comprising at least one component formed from an inventive composition of one or more embodiments described herein. Articles include, but are not limited to, sheets, foams, molded goods, and extruded parts. Additional articles include automotive parts, weather strips, belts, hoses, building profiles, wire and cable jacketing, flooring materials, gaskets, tires and tire components, computer parts, building materials and footwear components. A skilled artisan can readily augment this list without undue experimentation. In one embodiment, the article is an automotive part.

Definitions

Unless stated to the contrary, implicit from the context, or customary in the art, all parts and percents are based on weight, and all test methods are current as of the filing date of this disclosure.

The term "composition," as used herein, includes a mixture of materials, which comprise the composition, as well as reaction products and decomposition products formed from the materials of the composition. Any reaction product or decomposition product is typically present in trace or residual amounts.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure) and the term interpolymer as defined hereinafter. Trace amounts of impurities, such as catalyst residues, may be incorporated into and/or within a polymer.

The term "interpolymer," as used herein, refers to polymers prepared by the polymerization of at least two different types of monomers. The term interpolymer thus includes the term copolymer (employed to refer to polymers prepared from two different types of monomers) and polymers prepared from more than two different types of monomers.

The term "ethylene/α-olefin interpolymer," as used herein, refers to a polymer that comprises, in polymerized form, ethylene (based on the weight of the interpolymer), and at least one α-olefin. In one embodiment, the "ethylene/α-olefin interpolymer" comprises a majority weight percent of polymerized ethylene (based on the weight of the interpolymer).

The term "ethylene/α-olefin/diene interpolymer," as used herein, refers to a polymer that comprises, in polymerized form, ethylene, an α-olefin, and a diene. In one embodiment, the "ethylene/α-olefin/diene interpolymer" comprises a majority weight percent of polymerized ethylene (based on the weight of the interpolymer).

The term "ethylene/α-olefin/diene terpolymer," as used herein, refers to a polymer that comprises, in polymerized form, ethylene, an α-olefin, and a diene, as the only three monomer types. In one embodiment, the "ethylene/α-olefin/diene terpolymer" comprises a majority weight percent of polymerized ethylene (based on the weight of the interpolymer).

The term, "ethylene/α-olefin copolymer," as used herein, refers to a copolymer that comprises, in polymerized form, a majority amount of ethylene monomer (based on the weight of the copolymer), and an α-olefin, as the only two monomer types.

The term, "propylene-based polymer," as used herein, refers to a polymer that comprises, in polymerized form, a majority amount of propylene monomer (based on the weight of the polymer), and optionally may comprise one or more comonomers.

The term "solution polymerization," as used herein, refers to a polymerization process, in which the formed polymer is dissolved in the polymerization solvent (for example, a hydrocarbon based solvent like ISOPAR E). The solubility of the polymer will depend primarily on the polymerization temperature, the polymer composition and the polymer concentration.

The term "continuous solution polymerization," as used herein refers to a solution polymerization, in which monomer, solvent, and catalyst feeds are continually added to a reactor (for example, stirred tank, loop, pipe flow, etc.). Reactor effluent comprising polymer, solvent, catalysts and unreacted monomers is continually removed from the reactor. Continuous solution polymerization is distinct from batch polymerization, where the feeds are introduced prior to polymerization, and the reactor contents are removed at or near the end of polymerization. Semi-batch polymerization is similar to batch polymerization, but some feeds of monomer or catalyst may be continually added during the course of polymerization, while the reactor contents are again removed at or near the end of the polymerization.

The term "polymer solution," as used herein, refers to the complete dissolution of polymer in one or more solvents (typically much lower in molecular weight than polymer) to form a homogeneous (most often in liquid state) phase. The solution comprises the polymer and solvent, and may also comprise unreacted monomers and other residuals of the polymerization reaction.

The term "solvent," as used herein, refers to a substance (for example, a hydrocarbon or a mixture of two or more hydrocarbons (excluding monomer and comonomer)) that dissolves a species of interest, like a monomer and/or polymer, resulting in a liquid phase.

The term "borane compound," as used herein, refers to a compound containing one or more boron atoms, with each boron atom bonded to three (3) substituents.

The term "borate compound," as used herein, refers to a compound containing one or more boron atoms, with each boron atom bonded to four (4) substituents.

The term "alkyl aluminum compound," as used herein, refers to a compound containing one or more aluminum atoms, with each aluminum atom bonded to three (3) substituents.

The term "a polymer-rich solution," as used herein, refers to a solution containing from 99 to 100 wt % polymer, based on the weight of the solution.

The term "a polymer-free solution," as used herein, refers to a solution containing less than 1 wt % polymer, based on the weight of the solution.

The term "base compound," as used herein, refers to any chemical compound capable of neutralizing the acidic specie(s) present in the polymerizations and polymer isolations described herein. Base compounds include, but are not limited to, amines, alcohols and salts of fatty acids (for example, salts of stearic acid).

The term "separator," as used herein in reference to a polymerization, refers to a device that is used to separate a polymer solution into at least two fractions, each containing a different amount of polymer.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Test Methods

Density

Samples that are measured for density are prepared according to ASTM D-1928. Measurements are made within one hour of sample pressing using ASTM D-792, Method B.

Melt Index

Melt index ($I_2$) is measured in accordance with ASTM-D 1238, Condition 190° C./2.16 kg, and is reported in grams eluted per 10 minutes. Melt flow rate ($I_{10}$) is measured in accordance with ASTM-D 1238, Condition 190° C./10 kg, and is reported in grams eluted per 10 minutes.

Conventional Gel Permeation Chromatography (Conv. GPC)

A GPC-IR high temperature chromatographic system from, PolymerChAR (Valencia, Spain), was equipped with a Precision Detectors (Amherst, Mass.), 2-angle laser light scattering detector Model 2040, an IR5 infra-red detector and a 4-capillary viscometer, both from PolymerChAR. Data collection was performed using PolymerChAR InstrumentControl software and data collection interface. The system was equipped with an on-line, solvent degas device and pumping system from Agilent Technologies (Santa Clara, Calif.).

Injection temperature was controlled at 150 degrees Celsius. The columns used were three 10-micron "Mixed-B" columns from Polymer Laboratories (Shropshire, UK). The solvent used was 1,2,4-trichlorobenzene. The samples were prepared at a concentration of "0.1 grams of polymer in 50 milliliters of solvent." The chromatographic solvent and the sample preparation solvent each contained "200 ppm of butylated hydroxytoluene (BHT)." Both solvent sources were nitrogen sparged. Ethylene-based polymer samples were stirred gently at 160 degrees Celsius for three hours. The injection volume was 200 microliters, and the flow rate was one milliliters/minute. The GPC column set was calibrated by running 21 "narrow molecular weight distribution" polystyrene standards. The molecular weight (MW) of the standards ranges from 580 to 8,400,000 g/mole, and the standards were contained in six "cocktail" mixtures. Each standard mixture had at least a decade of separation between individual molecular weights. The standard mixtures were purchased from Polymer Laboratories. The polystyrene standards were prepared at "0.025 g in 50 mL of solvent" for molecular weights equal to, or greater than, 1,000,000 g/mole, and at "0.050 g in 50 mL of solvent" for molecular weights less than 1,000,000 g/mole.

The polystyrene standards were dissolved at 80° C., with gentle agitation, for 30 minutes. The narrow standards mixtures were run first, and in order of decreasing "highest molecular weight component," to minimize degradation. The polystyrene standard peak molecular weights were converted to polyethylene molecular weight using Equation 1 (as described in Williams and Ward, *J. Polym. Sci.*, Polym. Letters, 6, 621 (1968)):

$$M\text{polyethylene} = A \times (M\text{polystyrene})^B \quad \text{(Eqn. 1)},$$

where M is the molecular weight, A is equal to 0.4316 and B is equal to 1.0.

Number-average molecular weight (Mn(conv gpc)), weight average molecular weight (Mw-conv gpc), and z-average molecular weight (Mz(conv gpc)) were calculated according to Equations 2-4 below.

$$Mn(conv\ gpc) = \frac{\sum_{i=RV\ integration\ start}^{i=RV\ integration\ end} (IR_{measurement\ channel_i})}{\sum_{i=RV\ integration\ start}^{i=RV\ integration\ end} (IR_{measurement\ channel_i} / LogM_{PE_i})} \quad \text{(Eqn. 2)}$$

$$Mw(conv\ gpc) = \frac{\sum_{i=RV\ integration\ start}^{i=RV\ integration\ end} (LogM_{PE_i} IR_{measurement\ channel_i})}{\sum_{i=RV\ integration\ start}^{i=RV\ integration\ end} (IR_{measurement\ channel_i})} \quad \text{(Eqn. 3)}$$

$$Mz(conv\ gpc) = \frac{\sum_{i=RV\ integration\ start}^{i=RV\ integration\ end} (LogM_{PE_i}^2 IR_{measurement\ channel_i})}{\sum_{i=RV\ integration\ start}^{i=RV\ integration\ end} (LogM_{PE_i} IR_{measurement\ channel_i})} \quad \text{(Eqn. 4)}$$

In Equations 2-4, the RV is column retention volume (linearly-spaced), collected at "1 point per second," the IR is the baseline-subtracted IR detector signal, in Volts, from the IR5 measurement channel of the GPC instrument, and $LogM_{PE}$ is the polyethylene-equivalent MW determined from Equation 1, Data calculations were performed using "GPC One software (version 2.013H)" from PolymerChar.

Dynamic Mechanical Spectroscopy (DMS)

Small angle oscillatory shear (melt DMS) was performed using a TA Instruments ARES, equipped with "25 mm parallel plates," under a nitrogen purge. The time between sample loading, and the beginning of the test, was set to five minutes for all samples. The experiments were performed at 190° C., over a frequency range of 0.1 to 100 rad/s. The strain amplitude was adjusted, based upon the response of the samples from 1 to 3%. The stress response was analyzed in terms of amplitude and phase, from which, the storage modulus (G'), loss modulus (G"), dynamic viscosity η*, and tan delta were determined. Specimens for Dynamic Mechanical Spectroscopy were "25 mm diameter×3.3 mm thick" compression molded discs, formed at 180° C., and 10 MPa molding pressure, for five minutes, and then quenched between chilled platens (15-20° C.) for two minutes. The melt viscosity V was measured at each frequency. The rheology ratio (V0.1/V100 at 190° C.; also referred to as "RR") was recorded.

Mooney Viscosity

Mooney Viscosity (ML1+4 at 125° C.) was measured in accordance with ASTM 1646, with a one minute preheat time and a four minute rotor operation time. The instrument is an Alpha Technologies Mooney Viscometer 2000.

FTIR Method for EPDM Composition Analysis

The terpolymers containing ethylene, propylene, and 5-ethylidene-2-norbornene were analyzed using ASTM D9300 for its ethylene content, and ASTM D6047 for its ethylidene-norbornene (ENB).

GC Analysis

VNTC levels, for example, isomer levels, were analyzed in solvent, as well as the pure ENB, on a 6890 Agilent GC instrument using the following parameters.

Oven Temperature Program:

| Level | Rate | Next Temp | Hold Time |
|---|---|---|---|
| Initial | | 40° C. | 1 minute |
| 1 | 5° C./min | 130° C. | 0 minutes |
| 2 | 20° C./min | 230° C. | 5 minutes |

| Zones: | Column: |
|---|---|
| Inlet 280° C. | J&W DB-Wax column |
| Split Mode - Split | Length - 60 m |
| Split Flow - 200 ml/mm | ID - 0.32 mm |
| Split Ratio - 20:1 | Film Thickness - 0.5 μm |
| Detector - 250° C. | Carrier Flow - Constant Flow |
| | Flow - 3.0 ml/min |

The amount of the VNTC was measured in the polymer free solution, and this solution is typically recycled back to the reactor. This GC test method can be used to measure other compounds of Structure 2, and their corresponding dienes.

Experimental

Reagents

All solvents and monomers are first purified using adsorption beds to remove potential catalyst poisons. The solvents used was ISOPAR E.

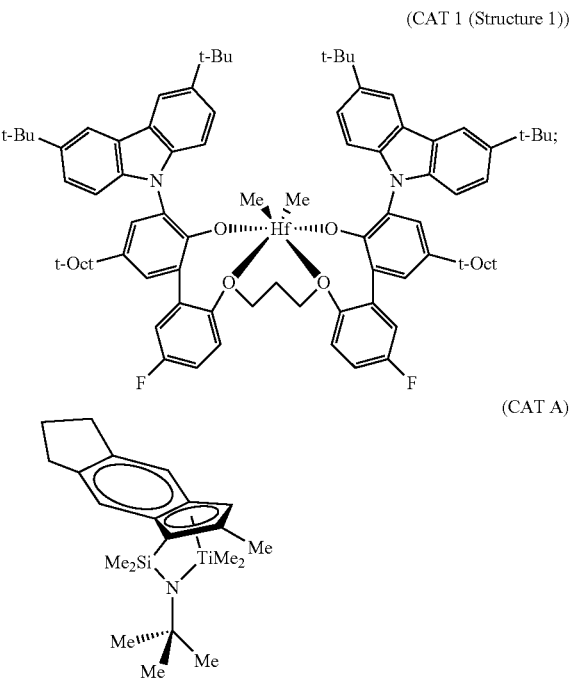

(CAT 1 (Structure 1))

(CAT A)

-continued

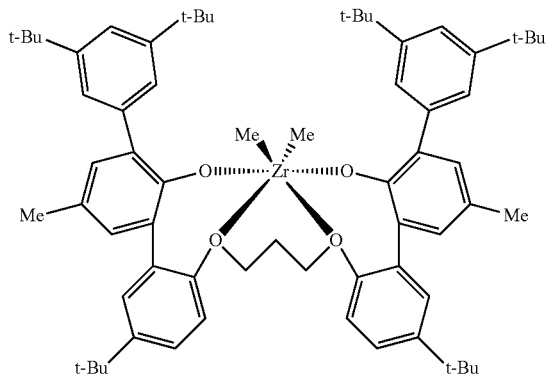

(CAT B)

Cocatalysts

Cocat 1: a mixture of methyldi(C14-18 alkyl)ammonium salts of tetrakis(pentafluorophenyl)-borate-[[(bis-hydrogenatedtallowalkylmethylammonium tetrakis-pentafluorophenylborate)—Supplied by Boulder Scientific]].

Cocat 2: (modified methaluminoxane) (MMAO-3A)—Supplied by Akzo-Nobel.

Structure 2

(Vinyl nortricyclene (VNTC); 13x molecular sieve available from aldrich).

Polymerizations

A schematic of a potential polymerization configuration is shown in FIG. 1. The final polymer solution, which exits the reactor, is eventually separated into a polymer-rich solution and a polymer-free solution. Typically, at least a portion, or all, of the polymer-free solution is recycled back to the reactor; here, there was no recycle in the polymerizations below, but the polymer-free solution was isolated in some of the polymerizations. The polymer in the polymer-rich solution is further isolated, and optionally, pelletized.

For each solution polymerization (Examples 1-5), ISOPAR-E solvent, ethylene, propylene, hydrogen, and ethylidene norbornene (ENB), were fed to a continuous, one gallon reactor, as shown in Table 1, to produce an EPDM polymer. CAT 1 was added at a concentration to control the ethylene conversion at 77% (determined from the amount of ethylene consumed divided by the amount of ethylene fed to the reactor). Cocat 1 and cocat 2 were added, at molar ratios to CAT 1, of 1.2 and 10 respectively.

In Examples 1 through 5, the vinyl nortricyclene (VNTC) was continuously added to the reactor, at levels from 0 to 450 wt ppm (based on the weight of the contents in the reactor), to maintain the level of VNTC at the respective 0 to 450 wt ppm. The level of VNTC in the reactor was determined by mass balance (based on the total content weight of the reactor).

For Examples 1-4, as the level of vinyl nortricyclene increased, both the Mooney Viscosity and the molecular weight of the interpolymer decreased. In Example 5, the concentration of the vinyl nortricyclene was held at 450 ppm, but the amount of hydrogen was adjusted, such that the Mooney viscosity of the interpolymer was 44 (similar to Example 1). In this case, the melt viscosity, at 0.1 rad/s, was significantly higher in Example 5 than in Example 1, indicating the strong effect the vinyl nortricyclene had on long chain branching, formed in the interpolymer—for example, significantly more long chain branching in Example 5, as compared to Example 1, Results are shown in Table 1 below.

Figure 2:
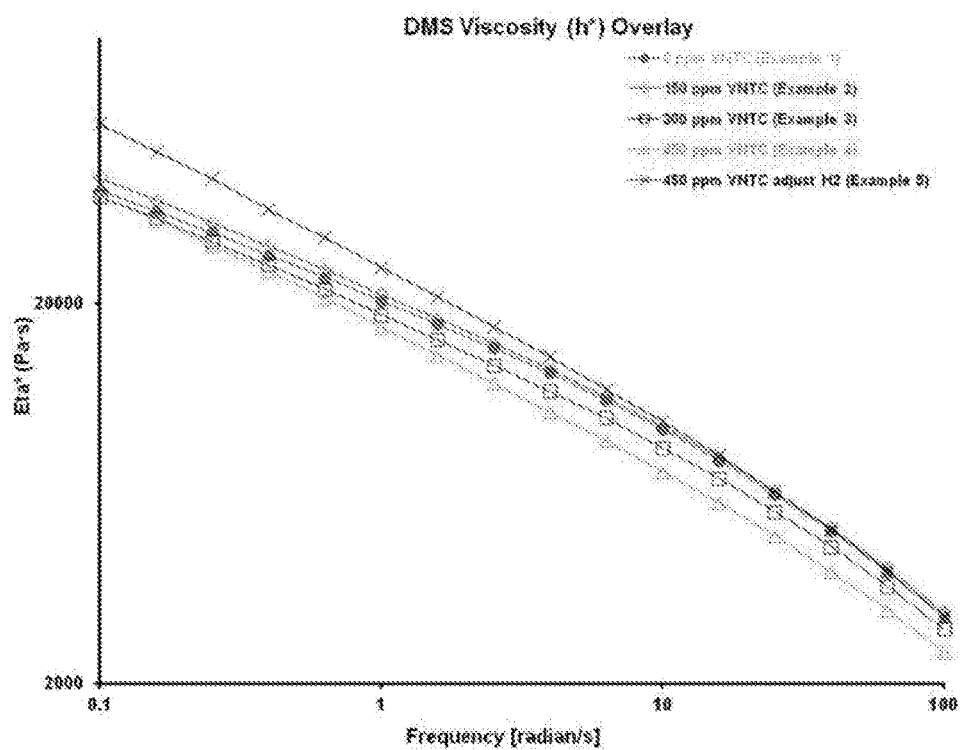
FIG. 2 depicts shear thinning profiles (Eta* versus frequency) for several interpolymers formed from polymerizations using varying amounts of vinylnortricyclene (VNTC).

FIG. 2 shows the increased level of shear thinning as the amount of the vinyl nortricyclene (VNTC) was increased, indicative of an increased level of long chain branching in the interpolymer. Polymerizations similar to Examples 1-5, and run in the presence of CAT A or CAT B, did not result in interpolymers with increased levels of long chain branching.

TABLE 1

Polymerizations and Polymer Properties

| Example | 1 | 2 | 3 | 4 | 5 |
|---|---|---|---|---|---|
| Polymerization Conditions | | | | | |
| ppm VNTC added to reactor | 0 ppm | 150 ppm | 300 ppm | 450 ppm | 450 ppm |
| Reactor Temp (° C.) | 121 | 120 | 120 | 120 | 120 |
| ethylene conversion (%) | 77.2 | 75.3 | 75.6 | 77.6 | 77.6 |
| solvent flow (lb/hr) | 27.8 | 27.6 | 27.2 | 26.9 | 26.9 |
| ethylene flow (lb/hr) | 2.51 | 2.52 | 2.52 | 2.52 | 2.51 |
| propylene flow (lb/hr) | 3.37 | 3.37 | 3.37 | 3.37 | 3.38 |
| total ENB flow (lb/hr) | 0.67 | 0.66 | 0.65 | 0.63 | 0.63 |
| total VNTC flow (lb/hr) | 0 | 0.00751 | 0.0129 | 0.0176 | 0.0176 |
| hydrogen flow (SCCM) | 77.96 | 79.94 | 77.96 | 77.96 | 62.96 |
| reactor pressure (psig) | 525 | 525 | 525 | 525 | 525 |
| EPDM Properties | | | | | |
| Mooney Visc. (ML 1 + 4, 125° C.) | 47.8 | 45.7 | 41.7 | 35.0 | 44.0 |
| Mw (g/mol) | 169,239 | 165,537 | 164,542 | 155,474 | 174,938 |
| Mn (g/mol) | 67,927 | 64,246 | 69,173 | 61,488 | 69,426 |
| Mw/Mn | 2.49 | 2.58 | 2.38 | 2.53 | 2.52 |
| Viscosity at 0.1 rad/s, 190° C. | 39,938 | 42,976 | 38,399 | 38,253 | 59,634 |
| Viscosity at 100 rad/s, 190° C. | 2,991 | 3,078 | 2,773 | 2,415 | 3,007 |

TABLE 1-continued

Polymerizations and Polymer Properties

| Example | 1 | 2 | 3 | 4 | 5 |
|---|---|---|---|---|---|
| Viscosity ratio (0.1 rad·sec$^{-1}$/100 rad·sec$^{-1}$; 190° C.) | 13.4 | 14.0 | 13.8 | 15.8 | 19.8 |
| tan δ at 0.1 rad/s, 190° C. | 2.24 | 2.17 | 2.35 | 2.18 | 1.77 |

Water, oil (PARALUX 6001) and/or bases (see Table 2 below) were optionally added, either before, or after, the heater section of the polymerization configuration, prior to polymer separation, as described in Examples 6-12, as shown in Table 2, In Examples 6 through 12, polymer was again made under similar conditions, as discussed above with CAT 1, and the level of VNTC in the reactor was controlled. For each solution polymerization (Examples 6-12), ISOPAR-E solvent, ethylene, propylene, hydrogen and ethylidene norbornene (ENB), were fed to a continuous, one gallon reactor, in the amounts shown in Table 2, to produce an EPDM polymer. For all these experiments, the polymer was produced in the reactor at about 120° C., and then the final polymer solution passed through a Heater set at 220° C., prior to solvent devolatilization. The amount of VNTC was measured in the isolated polymer-free solution by GC. All or most of the VNTC in the final polymer solution would be recycled back to the reactor. These results are shown in Table 2.

In Example 6, the interpolymer was produced with cocatalyst concentrations in the reactor at "6 wt. ppm cocat 1" and "2 wt. ppm cocat 2," each wt. ppm, based on the total content weight of the reactor. Also, in Example 6, 5.5 wt ppm water, based on the total content weight of the reactor, was added after the Heater. The level of ENB isomerization to VNTC was measured at 4.8 wt %, based on the weight of the ENB added to the reactor (also measured by the GC test method). It is assume that all of the VNTC present in the final polymer solution, before this solution is separated, is recycled back to the reactor. The amount of VNTC (4.8 wt %) corresponds to "531 wt ppm (as determined by GC)" of VNTC, based on the total content weight of the reactor. This level of VNTC would be maintained in the reactor via at least the recycle.

In Example 7, the levels of cocatalysts were decreased to "3 wt. ppm cocat 1" and "0.25 wt. ppm cocat 2," keeping all the other conditions the same. The level of isomerization was decreased to only 1.8 wt %. This example indicated that the cocatalyst level affected the amount of ENB isomerization to VNTC, and the cocatalyst level can be used to control level of ENB isomerization to VNTC. It is assume that all of the VNTC present in the final polymer solution, before the solution is separated, is recycled back to the reactor. The amount of VNTC (1.8 wt %) corresponds to "190 wt ppm (as determined by GC)" of VNTC, based on the total content weight of the reactor. This level of VNTC would be maintained in the reactor via at least the recycle.

In Example 8, the cocatalyst levels were returned to the original values, as in Example 6, and oil was added to the process before the Heater (see FIG. 1). In this case, the level of isomerization increased to 6.4 wt %, based on the weight of the ENB added to the reactor (also measured by the GC test method; 673 wt. ppm), indicating that the addition of oil increased the isomerization of the diene in the Heater (see, FIG. 1). It is assume that all of the VNTC present in the final polymer solution, before the solution is separated, is recycled back to the reactor. The amount of VNTC (6.4 wt %) corresponds to "673 wt ppm (as determined by GC)" of VNTC, based on the total content weight of the reactor. The level of VNTC would be maintained in the reactor via at least the recycle.

In Example 9, oil was added after the Heater, and the level of isomerization decreased to 4.2 wt %, based on the weight of the ENB added to the reactor (also measured by the GC test method; 441 wt. ppm), indicating that the oil addition, after the Heater, did not contribute to the ENB isomerization to VNTC. It is assume that all of the VNTC present in the final polymer solution, before the solution is separated, is recycled back to the reactor. The amount of VNTC (4.2 wt %) corresponds to "441 wt ppm (as determined by GC)" of VNTC, based on the total content weight of the reactor. The level of VNTC would be maintained in the reactor via at least the recycle.

In Example 10, no oil was added, and the baseline polymer was produced, similar to Example 6, but in this case "0.55 wt. ppm" water (based on the total content weight of the reactor) was added to the final polymer solution, before the Heater. In this case, the level of isomerization again increased to 5.8 wt % (based on the weight of the ENB added to the reactor (also measured by the GC test method)), indicating that water, alone, in the Heater can enhance the isomerization of ENB to VNTC. It is assume that all of the VNTC present in the final polymer solution, before the solution is separated, is recycled back to the reactor. The amount of VNTC (5.9 wt %) corresponds to "600 wt ppm (as determined by GC)" of VNTC, based on the total content weight of the reactor. The level of VNTC would be maintained in the reactor via at least the recycle.

In Example 11, polymer was made in the same manner as Example 8, with oil added before the Heater, but with the additional base 1 "CHIMASSORB 2020 (for example, available from BASF)," added at 100 wt. ppm, based on total content weight of the reactor, to neutralize acidic species present in the final polymer solution. In this case the level of isomerization was decreased to 2.8 wt %, based on total content weight of the reactor. It is assume that all of the VNTC present in the final polymer solution, before the solution is separated, is recycled back to the reactor. The amount of VNTC (2.8 wt %) corresponds to "294 wt ppm (as determined by GC)" of VNTC, based on the total content weight of the reactor. This level of VNTC would be maintained in the reactor via at least the recycle.

In Example 12, the polymer was made in the same manner as Example 8, with oil added before the Heater, but with the additional base 2 "triethylenetetramine (for example, available from Aldrich)" at 37 wt. ppm, based on total content weight of the reactor, added to neutralize the acidic species in the final polymer solution. In this case the level of isomerization was decreased to 1.1 wt % VNTC, based on total content weight of the reactor. It is assume that all of the VNTC present in the final polymer solution, before the solution is separated, is recycled back to the reactor. The amount of VNTC (1.1 wt %) corresponds to "122 wt ppm (as determined by GC)" of VNTC, based on the total content weight of the reactor. This level of VNTC would be maintained in the reactor via at least the recycle.

TABLE 2

Polymerizations and Polymer Properties

| Polym. Conditions | Example 6 | 7 | 8 | 9 | 10 | 11 | 12 |
|---|---|---|---|---|---|---|---|
| Reactor temp (° C.) | 120 | 120 | 120 | 120 | 120 | 120 | 120 |
| ethylene conversion (%) | 77 | 77 | 77 | 77 | 77 | 77 | 77 |
| solvent flow (lb/hr) | 28.6 | 28.1 | 28.5 | 28.6 | 28.4 | 28.9 | 28.8 |
| ethylene flow (lb/hr) | 2.10 | 2.50 | 2.11 | 2.11 | 2.12 | 2.11 | 2.11 |
| propylene flow (lb/hr) | 2.816 | 3.35 | 2.829 | 2.832 | 2.843 | 2.826 | 2.831 |
| total ENB flow (lb/hr) | 0.542 | 0.70 | 0.542 | 0.542 | 0.542 | 0.542 | 0.542 |
| hydrogen flow (SCCM) | 97.97 | 117 | 97.96 | 99.41 | 97.98 | 96.03 | 97.95 |
| reactor pressure (psig) | 526 | 525 | 525 | 525 | 524 | 525 | 525 |
| Cocatalyst 1 concentration (ppm) | 6 | 3 | 6 | 6 | 6 | 6 | 6 |
| Cocatalyst 2 concentration (ppm) | 2 | 0.25 | 2 | 2 | 2 | 2 | 2 |
| Addition to polymer solution exiting the reactor, before Heater | none | none | 0.6 lb/hr oil | none | 0.55 wt. ppm water | 0.6 lb/hr oil + 100 wt. ppm base 1 | 0.6 lb/hr oil + 37 ppm base 2 |
| Addition after Heater | 5.5 ppm water | 5.5 ppm water | 5.5 ppm water | 0.6 lb/hr oil | none | 5.5 ppm water | 5.5 ppm water |
| wt. ppm VNTC measured in polymer free solution after separator | 531 | 190 | 673 | 441 | 600 | 294 | 122 |
| wt % ENB conversion to VNTC [[GC]] | 4.9 | 1.7 | 6.4 | 4.3 | 5.8 | 2.8 | 1.1 |
| Mooney Viscosity of EPDM (ML 1 + 4, 125° C.) | 33 | 44 | 16 | 21 | 38 | 19 | 19 |

SCCM refers to standard cubic centimeter.

It has been discovered that vinylnortricyclene (VNTC) can be formed from an acid catalyzed isomerization of ethylidene norbornene (ENB) monomer, in the polymerization solution. It has also been discovered that the acids that catalyze the isomerization can be derived from one or more of the following sources: i) the cocatalyst(s) of the polymerization process, ii) the thermally decomposed cocatalyst(s) of the polymerization process, iii) the product formed through the reaction of one or more of the cocatalysts with water, iv) the product formed through the reaction of one or more of the cocatalysts with polar impurities found in the oil, and/or v) acidic species present in the oil and/or other agents added to the polymerization and/or added to the polymer solution that exits the reactor. It has also been discovered that the addition of a base, such as an amine, can be used to neutralize the acidic species formed during the polymerization, and/or neutralize the acid species present in oils or other agents added to the polymerization and/or added to the final polymer solution. Thus the addition of a base can prevent and/or reduce the ENB isomerization to VNTC.

The invention claimed is:

1. A process to form an ethylene/α-olefin interpolymer, said process comprising at least the following steps A) through C):

A) polymerizing, in at least one reactor, at least one reaction mixture comprising ethylene and the α-olefin, in a solution polymerization, and, in the presence of at least the following components I), II) and III), to form a final polymer solution;

I) at least one compound of Structure 1 below:

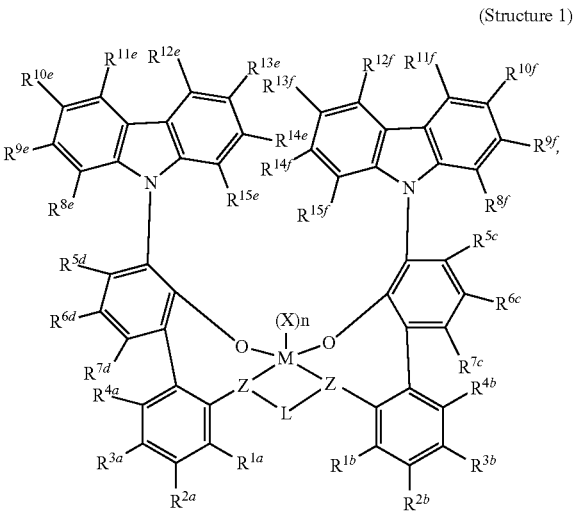

(Structure 1)

wherein for Structure 1:
M is titanium, zirconium, or hafnium, each independently being in a formal oxidation state of +2, +3, or +4; n is an integer of from 0 to 3, wherein when n is 0, X is absent;
each X independently is a monodentate ligand that is neutral, monoanionic, or dianionic; or two X are taken together to form a bidentate ligand that is neutral, monoanionic, or dianionic; and wherein X and n are chosen in such a way that the metal-ligand complex of Structure 1 is, overall, neutral;
each Z independently is O or S;

L is hydrocarbylene or heterohydrocarbylene, wherein the hydrocarbylene has a portion that comprises a 1-carbon atom to 6-carbon atom linker backbone, linking the Z atoms in Structure 1, and the heterohydrocarbylene has a portion that comprises a 1-atom to 6-atom linker backbone, linking the Z atoms in Structure 1, wherein each atom of the 1-atom to 6-atom linker backbone of the heterohydrocarbylene independently is a carbon atom or a moiety comprising a heteroatom, wherein each moiety comprising a heteroatom independently is O, S, S(O), S(O)2, Si($R^c$)2, Ge($R^c$)2, P($R^P$), or N($R^N$), wherein independently each $R^c$ is unsubstituted (C1-C18)hydrocarbyl or the two $R^c$ are taken together to form a (C2-C19)alkylene, each $R^P$ is unsubstituted (C1-C18)hydrocarbyl; and each $R^N$ is unsubstituted (C1-C18)hydrocarbyl, a hydrogen atom or absent;

R1a, R2a, R3a, R4a, R1b, R2b, R3b, R4b, R5c, R6c, R7c, R8e, R9e, R10e, R11e, R12e, R13e, R14e, R15e, R5d, R6d, R7d, R8f, R9f, R10f, R11f, R12f, R13f, R14f and R15f are each, independently, a hydrogen atom, an unsubstituted hydrocarbyl, a substituted hydrocarbyl an unsubstituted heterohydrocarbyl, a substituted heterohydrocabyl, or a halogen atom; and wherein two or more of R1a, R2a, R3a, R4a, R1b, R2b, R3b, R4b, R5c, R6c, R7c, R8e, R9e, R10e, R11e, R12e, R13e, R14e, R15e, R5d, R6d, R7d, R8f, R9f, R10f, R11f, R12f, R13f, R14f and R15f may, optionally, form one or more ring structures;

II) at least one co-catalyst selected from the following:
   i) a borane compound,
   ii) a borate compound,
   iii) an alkyl aluminum compound,
   iv) a combination of two or more from i) through iii);
III) at least one compound of Structure 2 below:

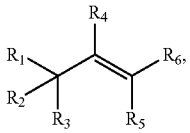

(Structure 2)

wherein, for Structure 2, R1, R2 and R3 are each, independently, hydrogen, an unsubstituted hydrocarbon, a substituted hydrocarbon, and/or two or more of R1, R2 and R3 may, optionally, form one or more ring structures; and wherein if R1 is hydrogen, then R2 and R3 are each not hydrogen; and if R2 is hydrogen, then R1 and R3 are each not hydrogen; and if R3 is hydrogen, then R1 and R2 are each not hydrogen; and wherein R4, R5 and R6 are each, independently, hydrogen, an unsubstituted hydrocarbon, or a substituted hydrocarbon;

B) separating the final polymer solution into at least a polymer-rich solution and a polymer-free solution; and wherein, optionally, at least a portion of the polymer-free solution is recycled back to the reactor;

C) maintaining the level of the at least one compound of Structure 2 in the at least one reactor, from 100 ppm to 10,000 ppm, based on the total content weight of the reactor; and wherein for step C), the level of the at least one compound of Structure 2 is maintained using one or more of the following features:

a) adding water to the final polymer solution, after this solution exits the at least one reactor, at a level from 0.1 to 1000 ppm, based on the total content weight of the reactor, and wherein, after the addition of the water, at least a portion of the polymer-free solution is recycled back to the reactor;

b) increasing or decreasing the level of the at least one co-catalyst of component II), and wherein, after the final polymer solution exits the at least one reactor, and at least a portion of the polymer-free solution is recycled back to the reactor;

c) adding at least one base compound to the final polymer solution, after this solution exits the at least one reactor, and wherein, after the addition of the base compound, at least a portion of the polymer-free solution is recycled back to the reactor;

d) adding at least one oil to the final polymer solution, and after this solution exits the at least one reactor, and wherein, after the addition of the oil, at least a portion of the polymer-free solution is recycled back to the reactor;

e) continuously adding the compound of Structure 2 to the reactor, to maintain the level of this compound, in the reactor, from 100 ppm to 10,000 ppm, based on the total content weight of the reactor;

f) any combination of two or more from a) through e).

2. The process of claim 1, wherein the process further comprises monitoring the level of the at least one compound of Structure 2 in the polymer-free solution.

3. The process of claim 1, wherein, for step A), the at least one compound of Structure 2, is added to the at least one reactor, in an amount from 100 ppm to 10,000 ppm, based on the total content weight of the reactor.

4. The process of claim 1, wherein the at least one compound of Structure 2 is formed in-situ, in the reactor, from isomerization of a diene.

5. The process of claim 1, wherein, for step A), the at least one co-catalyst is added to the at least one reactor, in an amount from 0.1 to 100 ppm, based on the total content weight of the reactor.

6. The process of claim 1, wherein, for step C), at least one base compound is added to the final polymer solution, in an amount from 10 ppm to 1000 ppm, based on the total content weight of the reactor.

7. The process of claim 1, wherein, for step C), at least one oil is added to the final polymer solution, before the polymer solution enters a separator.

8. The process of claim 1, wherein the final polymer solution is subject to a thermal treatment, prior to step B).

9. The process of claim 1, wherein, for Structure 2, R1, R2 and R3 are each, independently, an unsubstituted hydrocarbon, and/or two or more of R1, R2 and R3 form one or more ring structures.

10. The process of claim 1, wherein Structure 2 is selected from the following compounds 1b through 34b:

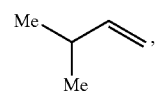

1b

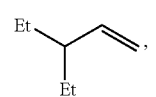

2b

-continued
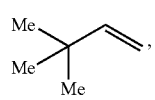
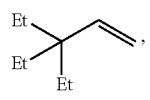
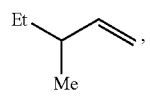
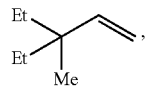
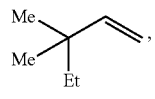
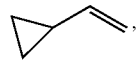
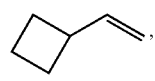
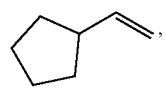
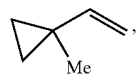
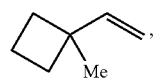
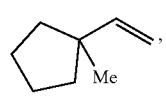
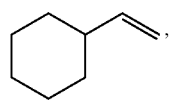
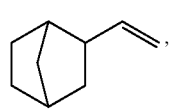
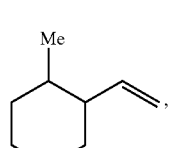
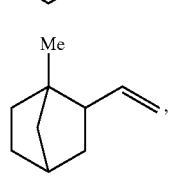
-continued
3b 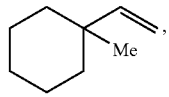
4b 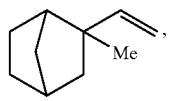
5b 
6b 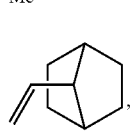
7b 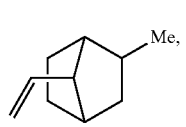
8b 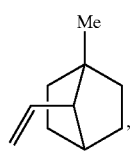
9b 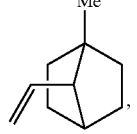
10b 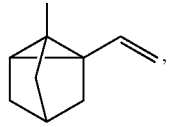
11b 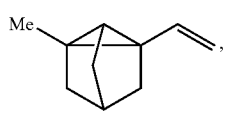
12b 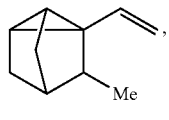
13b 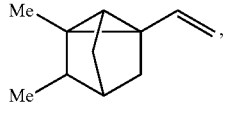
14b 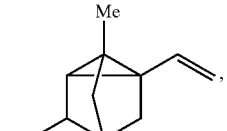
15b 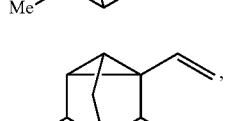

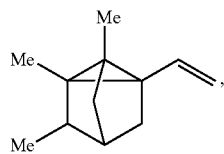,
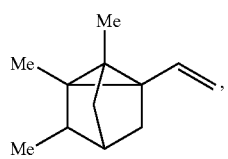,
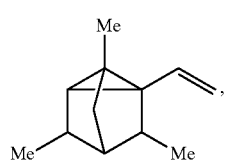,
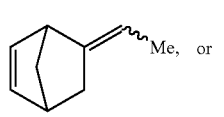 Me, or
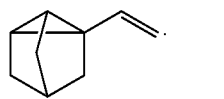.
* * * * *